Figure 1:
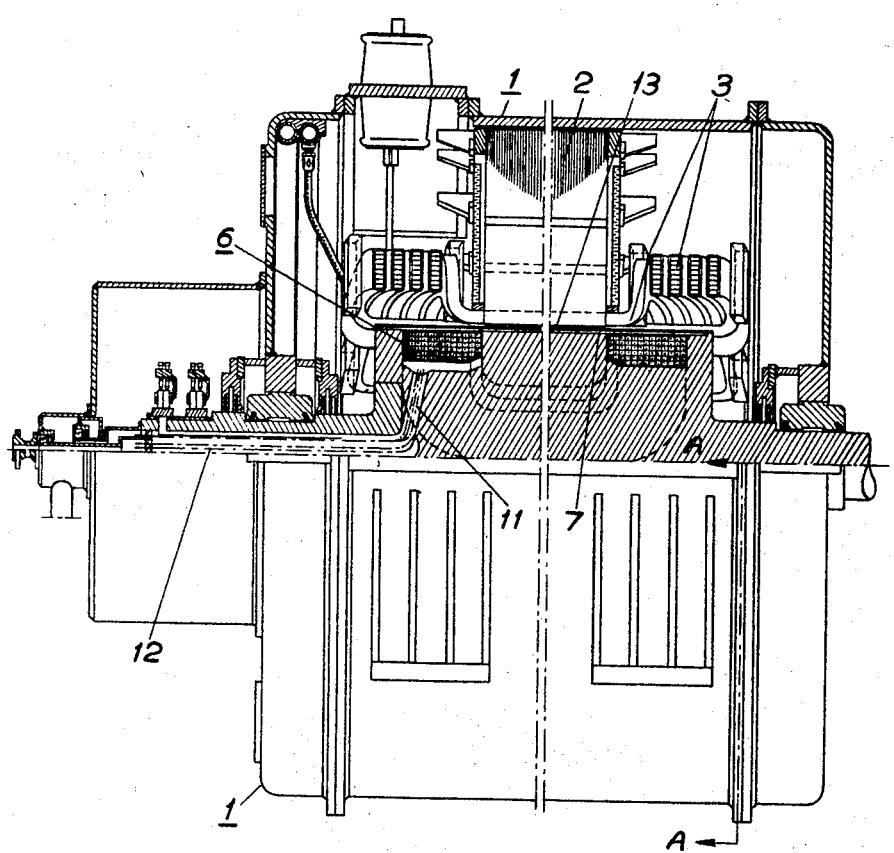

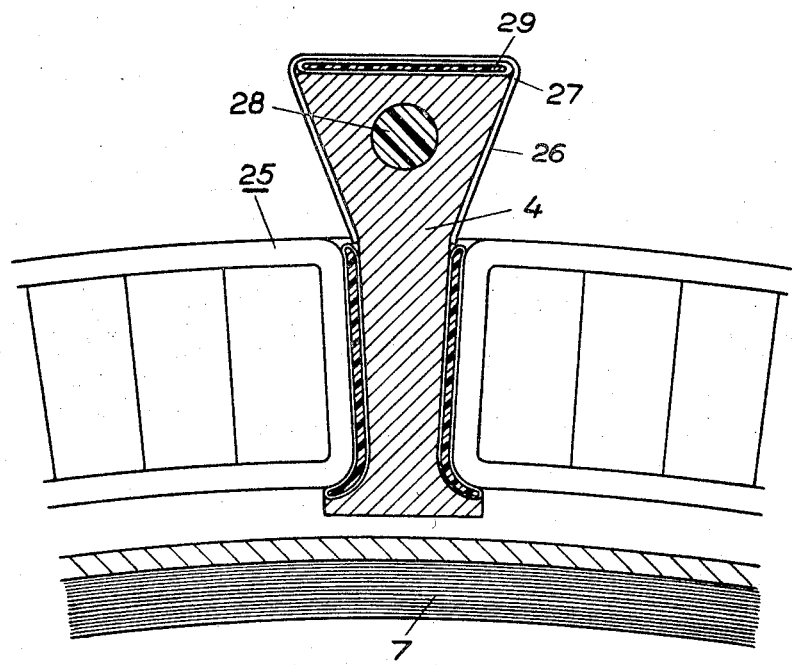
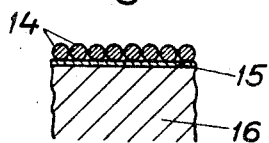
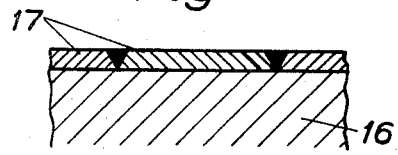

United States Patent Office 3,405,294
Patented Oct. 8, 1968

3,405,294
ROTOR STRUCTURE FOR A HIGH POWER SYNCHRONOUS MACHINE OF THE TURBO TYPE
Kristian Dahl Madsen, Vasteras, Sweden, assignor to Allmänna Svenska Elektriska Aktiebolaget, Vasteras, Sweden, a corporation of Sweden
Filed Oct. 19, 1965, Ser. No. 497,970
Claims priority, application Sweden, Nov. 26, 1964, 14,267/64
14 Claims. (Cl. 310—86)

The present invention relates to a two-pole high power synchronous machine of the turbo type, which machine is made with high average induction in the air gap, for example 1.5 Tesla, and is provided with an armature winding which is arranged on the stator and with a rotor with a magnet core and field winding. By high power machine is meant here a machine which has a power of more than 10 million volt amperes. A machine according to the invention can with advantage be constructed with a power of 100 million volts and above. The high air gap induction means that no substantial reduction of the magnetic resistance in the air gap can be obtained by making the stator core with teeth. A machine for very high air gap induction, for example 1.5 Tesla, must, if advantageous characteristics are to be achieved, be made substantially as a machine with a slotless armature. With a machine according to the invention it is thus required in the first place that the field winding shall produce an unusually large flux in the air gap, and in the second place that this large flux shall be produced in spite of the fact that the magnetic air gap resistance is considerably higher than in conventional machines. Accordingly, there will be heavy demands on the efficiency of the field system.

It has already been proposed to make a turbo-generator with a slotless stator and in connection with this to embed the armature winding in a hollow cylinder of insulating material, the cylinder being fastened to the stator. During the construction of the known machine, however, no attempt has been made to utilise the existing possibilities of high air gap induction. Such possibilities are present since there are no teeth in the stator and accordingly no maximal tooth density limiting the air gap density, as in conventional machines. With the known machine a reduction of the air gap density due to the increased air gap of the air gap induction has, on the contrary, been accepted and the increase of the short circuit conditions of the machine which are reached through the increase of the air gap has been considered as a sufficiently large advantage for justifying a slotless stator. Thus, the machine is made with a conventional rotor.

In a machine according to the invention, a radical deviation from the conventional turbo rotor construction has made it possible to obtain an unusually high air gap density in spite of the extremely great effective air gap in a machine where the stator—at least from a magnetic point of view—is slotless, or substantially slotless.

Ever since the first turbo-generators which were usable in a practical way were manufactured, it has been considered that in such machines, particularly at high power, it was absolutely necessary to make the turbo rotor with winding slots, either as a parallel slot rotor or as a radial slot rotor—the latter being particularly the case with very high power. The slots were thought to be necessary in order that the winding should be able to withstand the large centrifugal stresses and the large magnetic stresses which it was subjected to. In such rotors a considerable number of teeth are not much utilised magnetically. Certain teeth thus have a flux density which is almost equal to zero. Besides this, the arrangement of the winding in a plurality of slots means that the maximum radial dimensions of the winding will be relatively large in relation to the total copper cross section of the rotor, so that the part of the rotor core lying between the bottom of the slots has a relatively small cross section perpendicular to the flux. Even at low average density in the air gap, a saturation of the rotor core and the teeth placed nearest to the centre of the pole occurs, so that the air gap induction obtainable at moderate heating and/or magnetisation losses is thus strictly limited.

In a machine according to the invention, there has been a radical changeover regarding the manufacture of the turbo rotor. In order to obtain a high air gap density, the rotor iron has in the first place been utilised for serving purely magnetic purposes and the centrifugal forces acting on the winding are taken up by a special mechanical construction element particularly suitable for this purpose and comprising at least one prestressed hollow cylinder surrounding the rotor, the cylinder being made from a metal of very high tensile strength. The turbo rotor is then made as a two-pole rotor with salient poles.

While the quality of the steel in a conventional turbo rotor must be chosen with consideration of the large tensile stresses exerted on the roots of the teeth, in a machine according to the invention such problems need not be considered, and the steel quality can largely be chosen from purely magnetic points of view, so that a considerable reduction of the magnetic resistance of the rotor iron is achieved.

It has already been proposed to surround a turbo rotor with a hollow cylinder of non-magnetic material of such a thickness that the cylinder alone—without the help of slot wedges—can take up the centrifugal forces acting on the winding. However, according to the known proposal the rotor winding is placed in slots in the conventional way, among other things in order that short circuit forces will be taken up by means of the rotor teeth. Since it is the maximum radial dimension of the rotor winding which is determining for the tensile stress in the hollow cylinder and not the total amount of copper in the rotor, it has turned out that the necessary thickness of the hollow cylinder in a machine according to the known proposal is so large with large rotor diameter and a high number of revolutions that the proposed construction cannot be used in large turbo-generators.

In a machine according to the invention, the space otherwise occupied by rotor teeth is used for winding of copper, so that a considerable reduction of the maximum radial dimension of the rotor winding is achieved and accordingly the hollow cylinder or hollow cylinders which are to take up the centrifugal forces can be dimensioned with a moderate thickness.

Figure 2:
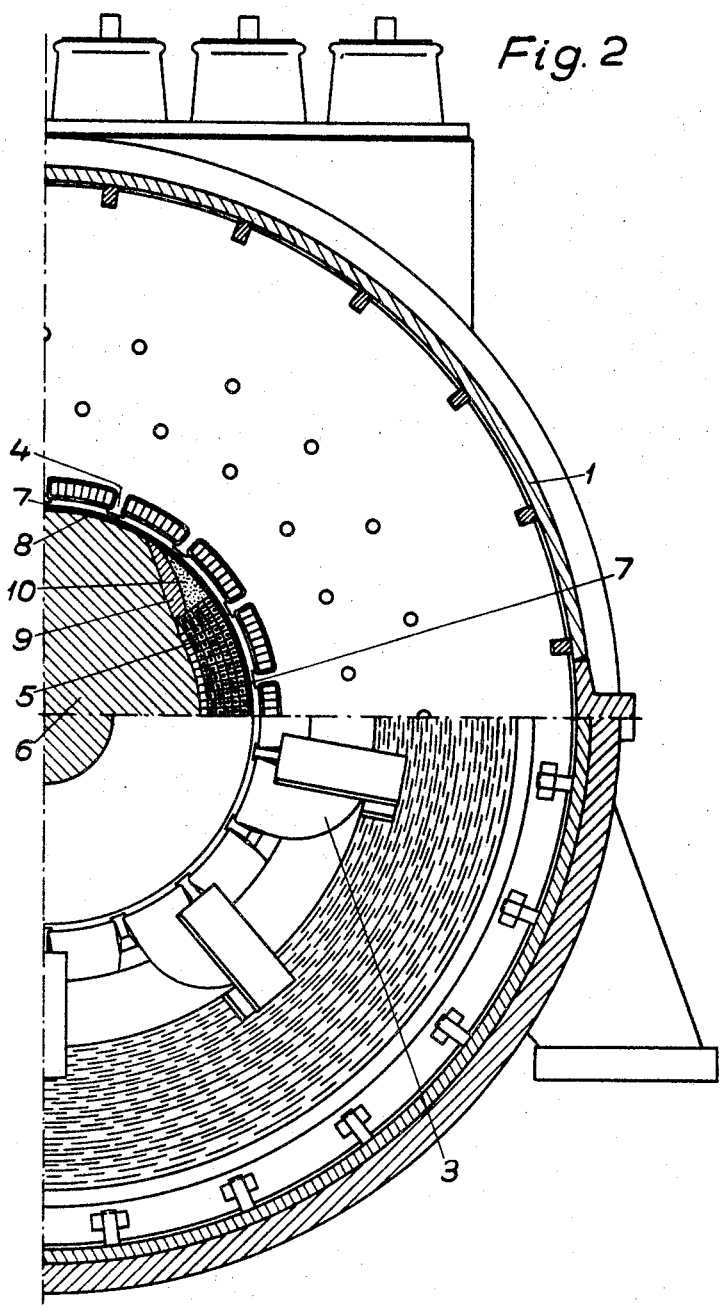
Figure 3:
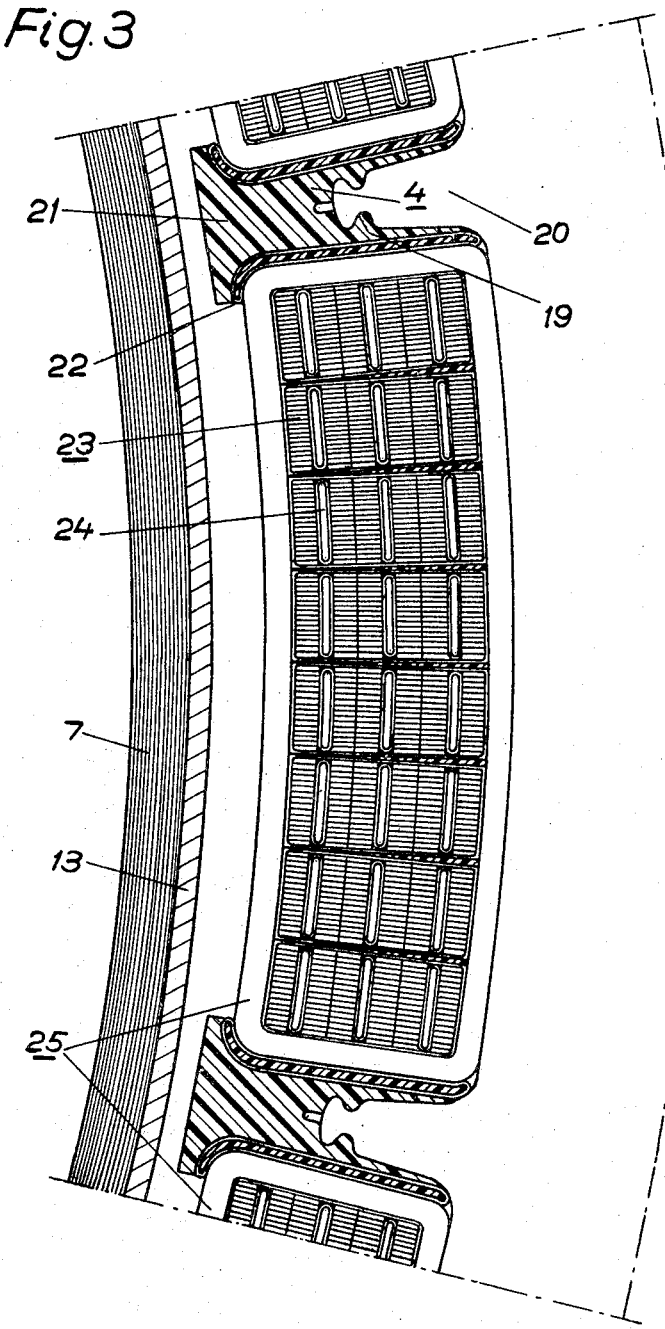

In the following the invention will be described with reference to the accompanying schematic drawings, where FIG. 1 shows a machine according to the invention, partly in side view, partly in axial section. FIGURE 2 shows a half of the machine, partly a radial section through the centre of a pole, partly a radial section along the line A—A on FIGURE 1. FIGURES 3 and 4 show two different embodiments of a stator tooth intended for mechanical purposes and FIGURES 5, 6 and 7 show different embodiments of hollow cylinders intended to enclose the rotor.

In the figures the numeral 1 denotes a housing in which a synchrogenerator of the turbo type with a power of 100 million volt amperes and a number of revolutions of 3000 r./sec. is encapsulated. The stator core 2 supports an internally cooled stator winding 3. Each stator coil has eight turns and each coil side is fastened between two stator teeth 4, which are dimensioned so as to take up the tangential forces which during short circuiting act on the coil side. The stator teeth have little or no importance as conductors for the machine flux and are completely or partly made of non-magnetic material, which is fastened to the stator laminations, for example as shown on FIGURE 3 or 4. Thus, from a magnetic point of view the stator is to be regarded as a substantially slotless stator. The rotor winding is made of a saddle-like coil for each pole and the axially oriented parts of this coil are denoted by 5 and the parts located axially outside the air gap are denoted by 6. The part of the rotor core which is surrounded by the stator core constitutes the rotor poles which, together with one shaft end and rotor core parts located axially outside the air gap, are made in one piece. Outside the air gap the rotor core is made with tangential slots in which the coil parts 6 are placed. Each rotor end is made with a cylindrical part lying axially outside the coils, the radial extension of said part being equal to the maximum pole height and constant along the complete circumference. The rotor is provided with a homogenous hollow cylinder 7 which is manufactured of special steel with very high tensile strength and arranged with its inside against the air gap surfaces 8 of the poles, against all rotor coil surfaces which are facing radially outwards and against the circular cylinder surfaces belonging to the rotor core and located axially outside the coil ends. Two separate pole parts 9 are fastened to each pole, the parts being each made with a cross section which substantially has the form of a segment of a circle with a cut off point. The axially oriented parts 5 of the rotor coils are supported in tangential direction by the pole parts 9 and by the filling bodies 10 which are made of non-magnetic material. As is evident from the above, the rotor winding is encapsulated in a hollow space which is formed between the hollow cylinder 7 and grooves formed in the rotor core. This hollow space is connected by radial channels 11 in the rotor core with an axial channel 12 which is bored in one of the shaft ends. The feeding conductors of the rotor winding and a relatively large number of tube conduits for the coolant of the directly cooled rotor conductors are placed in the channels 11 and 12. The rotor winding lies quite compactly in the above mentioned hollow space, since this is vacuum impregnated with epoxy resin, which is pumped in under high pressure through the channels 12 and 11 through that part of the channel cross section which is not taken up by cooling tubes and electrical feeding conductors. Thereby at the same time a very strong pre-stressing of the hollow cylinder 7 is obtained. By maintaining the high pressure in the epoxy resin even during the setting, such a strong pre-stressing is obtained in the completed rotor that the radially directed pressure between the rotor core and rotor winding in spite of the large centrifugal forces can be maintained even up to permissible overspeed. This means that the hollow cylinder 7 is not subjected to any appreciable extension and thus, during all operating conditions, retains the rotor winding in a reliable way. As the hollow cylinder 7 is made of magnetic material, it forms a magnetic connection from pole to pole, through which a stray flux flows. Since the machine is made for very high flux, 1.5 Tesla, the magnetic connection is thus subjected to saturation even at a number of ampere turns which is very small in relation to the normal number of ampere turns, and accordingly the stray flux through the ring constitutes only a relatively small and fully acceptable part of the main flux. Because of the magnetic conductivity of the hollow cylinder 7, the part of the hollow cylinder 7 lying against the pole surface gives a reduction of the air gap and consequently an increase of the machine flux, which fully compensates for the stray flux flowing through the ring. As is evident from the figure, all parts of the rotor winding are made with substantially the same radial dimensions. This contributes to the high utilisation of material obtained, since it is the maximum extension of the rotor winding in radial direction which determines the dimensioning of the hollow cylinder 7. The desired uniformity of radial winding dimensions is obtained by giving the cross section of the pole a special unconventional form and by a happy coincidence this pole design is optimal, even as regards magnetic conductivity. In contrast to that which is the case with conventional two-pole rotors, the pole has its maximum width in the part most distant from the air gap surface and the pole sides adjacent to the coil sides have substantially the form of a circular cylindrical surface. The result is that the flux density substantially becomes constant throughout that part of the rotor core which is surrounded by the stator core, in spite of the stray flux which passes through the axially oriented parts of the rotor coils.

As will be evident from FIG. 1 the rotor core is designed in such a way that the space axially outside the air gap and radially inside the coil parts 6 is almost totally occupied by magnetic material. Thus an appreciable increase is achieved as regards the ability of the rotor core to conduct the flux from one pole to another, which contributes to making the machines more suited for a high flux density in the air gap.

The rotor is provided with a damping winding which in FIG. 1 and 3 is designated by 13. The damping winding consists of a layer of tin plated copper wire wound around the hollow cylinder 7, the turns being soldered to each other.

The machine described in connection with FIGURES 1 and 2 is only one of several possible embodiments of the invention. Instead of the homogenous cylinder 7 manufactured of special steel, a combination of several different construction elements can be used. For example a hollow cylinder made from a relatively thin and soft sheet material can be arranged directly against the field winding and the air gap surfaces of the poles can be used in combination with a very strong cylinder which is manufactured by a large number of turns of hard drawn and pre-stressed steel wires wound immediately beside each other in the axial direction and in one or more layers. The steel wires are preferably wound with such a high pre-stressing that the centrifugal forces which occur during operation are unable to cause any appreciable extension of the steel wire cylinder. A part of a rotor constructed in this way is shown in axial section on FIGURE 5, where 14 denotes the pre-stressed steel wires, 15 the sheet cylinder lying inside and 16 the rotor pole.

Instead of a steel cylinder with homogeneity in all directions, for example that shown in FIGURES 1 and 2, or instead of the wound steel cylinder on FIGURE 5, a hollow cylinder can be used, consisting of several steel rings arranged axially one beside the other and welded to each other, as shown in axial section in FIG. 6. Further, in order to get relatively small stray flux it can be advantageous to join together the hollow cylinder by sectors following peripherally one after the other, the sectors being made of alternately magnetic and non-magnetic material, and to arrange the hollow cylinder so that the magnetic sectors will lie against the air gap surface of the poles and the non-magnetic sectors against the axially oriented parts of the rotor winding. FIGURE 7 shows in radial section a part of such a hollow cylinder, where 18 designates a magnetic sector and 19 a non-magnetic sector. The annular sectors 18 and 19 are soldered together in a substantially tangentially oriented contact surface.

On FIGURE 3, the numeral 20 designates an axially oriented radial projection belonging to the stator body and effected by alignment of corresponding projections formed in the laminations by punching. The tooth 4 consists of the projection 20 in combination with a body 21 made of glass fibre laminate, which is fixed to the projection 20 by means of axial slots 19 formed in the projection 20 and which engage with corresponding tangentially directed projections on the non-magnetic body 21. A strong pressure between the stator tooth and adjacent coils 25 is effected by means of the flat epoxy resin-filled tubes 22, in which the epoxy resin is injected and cured under high pressure. Since the body 21 is made of non-magnetic material, the minimum distance between rotor and stator is relatively large and the flux fluctuations caused by the projection 20 do not give rise to any considerable eddy current losses in the rotor. Each armature conductor 23 is provided with a cooling channel 24. Since it has been shown that the main part of the eddy current losses generated in the conductor in a machine according to the invention is caused by the radial components of the main flux, each armature conductor 23 is composed of a large number of partial conductors arranged tangentially beside each other and insulated from each other. Since there is also a certain tangentially directed flux component, the conductor is also divided up in the radial direction, although with considerably greater division distance than in the tangential direction. It has been shown that the special conditions in a machine according to the invention demand surprisingly small dimensions in the partial conductors. At 50–60 cycles per second the tangential dimension must not be greater than 2.5 mm. and the radial dimension should not be greater than 10 mm. if a workable machine is to be produced. The sub-division in radial direction requires a corresponding transposition while the tangential dividing up should be carried out without corresponding transposition of the partial conductors.

The stator tooth shown on FIGURE 4 is also constructed so as to avoid magnetic fluctuations of tooth frequency. The tooth 4 is entirely made of non-magnetic material and fixed in an axial dove-tail slot 26 made in the stator laminations and insulated from the stator laminations by means of the insulation 27. The tooth is composed of several parts arranged axially one beside the other and these are kept together by means of a glass fibre rod 28. Between the tooth 4 and the adjacent coils 25, flat tubes 22 filled with epoxy resin are arranged in the same way as in FIGURE 3, and a similar tube 29 is arranged between the tooth 4 and the slot bottom.

The tooth constructions shown in FIGURES 3 and 4 are particularly favourable when all winding turns lying between two teeth are enclosed by a common coil insulation and thus make a rigid unit such as is shown on FIGURE 3. In such a case one cannot use teeth which are punched out in the conventional way, and it is necessary to use separate teeth or teeth parts which are to be fixed to the stator when all stator coils are placed in position.

I claim:

1. High power synchronous machine of turbo type and with an average flux density of at least 1.2 Tesla in the air gap, comprising a laminated stator, an armature winding arranged on said stator and a bi-polar rotor surrounded by said stator, said rotor comprising a rotor core with two salient poles and an internally ventilated field coil for each of said poles, a retaining body surrounding said rotor core and said coils, the radial inner surface of said body comprising a circularly cylindrical surface, said body being arranged in pressure engagement against the whole of the radially outwards facing surface of said coils, at least a cylindrical part of said body being sufficiently pre-stressed for maintaining said pressure at normal rotor speed, the radial thickness of said coils being substantially constant.

2. High power synchronous machine as claimed in claim 1, said retaining body comprising a homogenous hollow cylinder of magnetic steel with homogeneity in the tangential direction.

3. High power synchronous machine as claimed in claim 1, said retaining body comprising a large number of turns of hard drawn wire.

4. High power synchronous machine as claimed in claim 1, said retaining body comprising a hollow cylinder composed of alternating magnetic and non-magnetic segments arranged tangentially one beside the other, with the magnetic segments opposite the pole surfaces.

5. High power synchronous machine as claimed in claim 1, said retaining body comprising an inner hollow cylinder of relatively thin sheet material and a pre-stressed hollow cylinder surrounding the inner cylinder.

6. High power synchronous machine as claimed in claim 1, each end of said rotor core being provided with circumferential, substantially annular grooves containing coil parts located axially outside the poles, said grooves being axially outwardly limited by core parts of a constant radial extension which is equal with the maximum pole height, said grooves being closed by said retaining body and constituting a part of a hollow space encapsulating said rotor coils, said hollow space being vacuum impregnated with an insulating resin.

7. High power synchronous machine according to claim 1, the retaining body comprising a plurality of highly pre-stressed hollow cylinders lying close to the radially outwardly facing surfaces of the poles and the rotor winding enclosing the rotor, said cylinders being so dimensioned that together they take up at least the main part of the centrifugal forces acting on the field winding, axially extending parts of the rotor winding containing a number of layers of insulated conductors arranged immediately beside each other in the tangential direction, at least the greater part of said layers only bordering on adjacent rotor core parts in the radial direction.

8. High power synchronous machine according to claim 1, the retaining body comprising an inner hollow cylinder of relatively thin metal surrounding the rotor and a hollow cylinder arranged outside the inner cylinder, the outer cylinder being of magnetic material having great strength.

9. High power synchronous machine according to claim 1, comprising flattened tubes between stator tooth and adjacent coil sides, and a hardened curable mass within the tubes cured under high pressure therein.

10. High power synchronous machine according to claim 1, the field coils having a hollow conductor therein, a plurality of cooling tubes connected with the hollow conductor, and a central shaft channel connected to the hollow conductor.

11. High power synchronous machine according to claim 1, said retaining body comprising at least one pre-stressed cylinder surrounding the rotor, and a damping winding of material having good conductivity, which is wound along at least one helix surrounding the rotor with electrical contact at contact surfaces between immediately adjacent turns surrounding said cylinder.

12. High power synchronous machine according to claim 11, said damping winding having a constant radial dimension and having a layer of turns overlapping each other and having a plurality of cooling channels each running along a corresponding helix, axially running supply and outlet channels in the rotor, and supply and outlet channels in the rotor iron connecting the cooling channels to said axially running supply and outlet channels.

13. High power synchronous machine according to claim 11, the radially outer part of the rotor poles being provided with cooling channels for leading away heat generated in the damping winding, axially running supply and outlet channels for a coolant and radial supply and outlet channels in the rotor iron connecting the cooling channels with said axially running supply and outlet channels.

14. High power synchronous machine according to claim 11, at least one layer of pre-stressed wire having high mechanical strength and low electrical conducting capacity surrounding the damping winding.

References Cited

UNITED STATES PATENTS

| | | | |
|---|---|---|---|
| 2,711,286 | 6/1955 | McAdam | 310—86 |
| 3,031,973 | 5/1962 | Kramer | 310—90 |
| 3,053,189 | 9/1962 | White | 310—90 |
| 3,191,079 | 6/1965 | Gitzendanner | 310—90 |

MILTON O. HIRSHFIELD, *Primary Examiner.*

L. L. SMITH, *Assistant Examiner.*